F. HOFMANN.
POCKET FIRE OR LIGHTING APPLIANCE WITH PYROPHORIC METAL.
APPLICATION FILED DEC. 14, 1910.
1,086,175.
Patented Feb. 3, 1914.
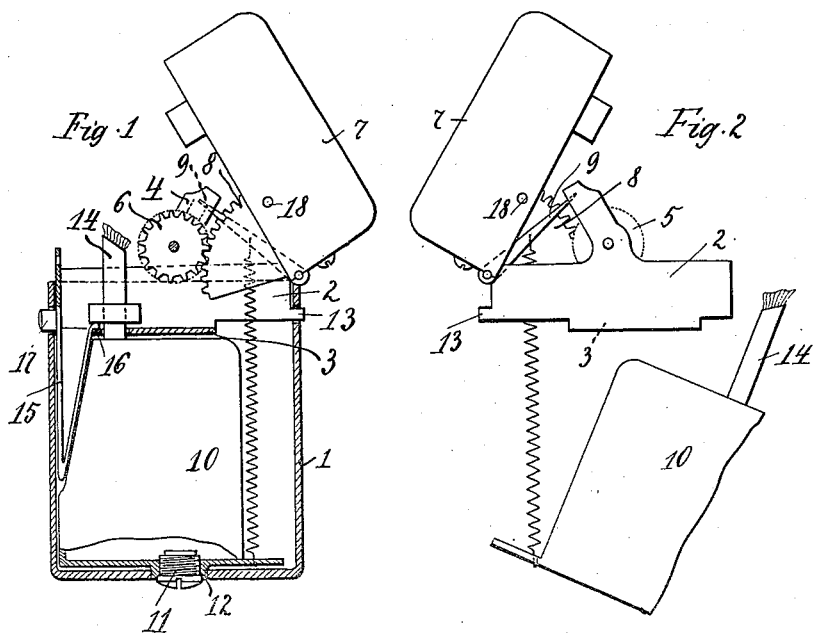
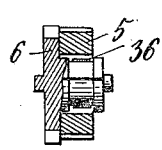
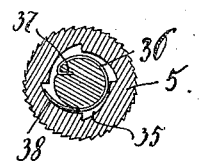
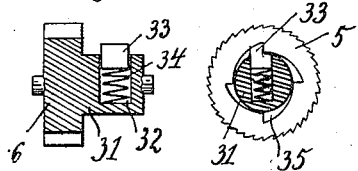
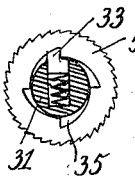
Witnesses:
J. P. Davis
Inventor:
Fritz Hofmann
BY
ATTORNEYS

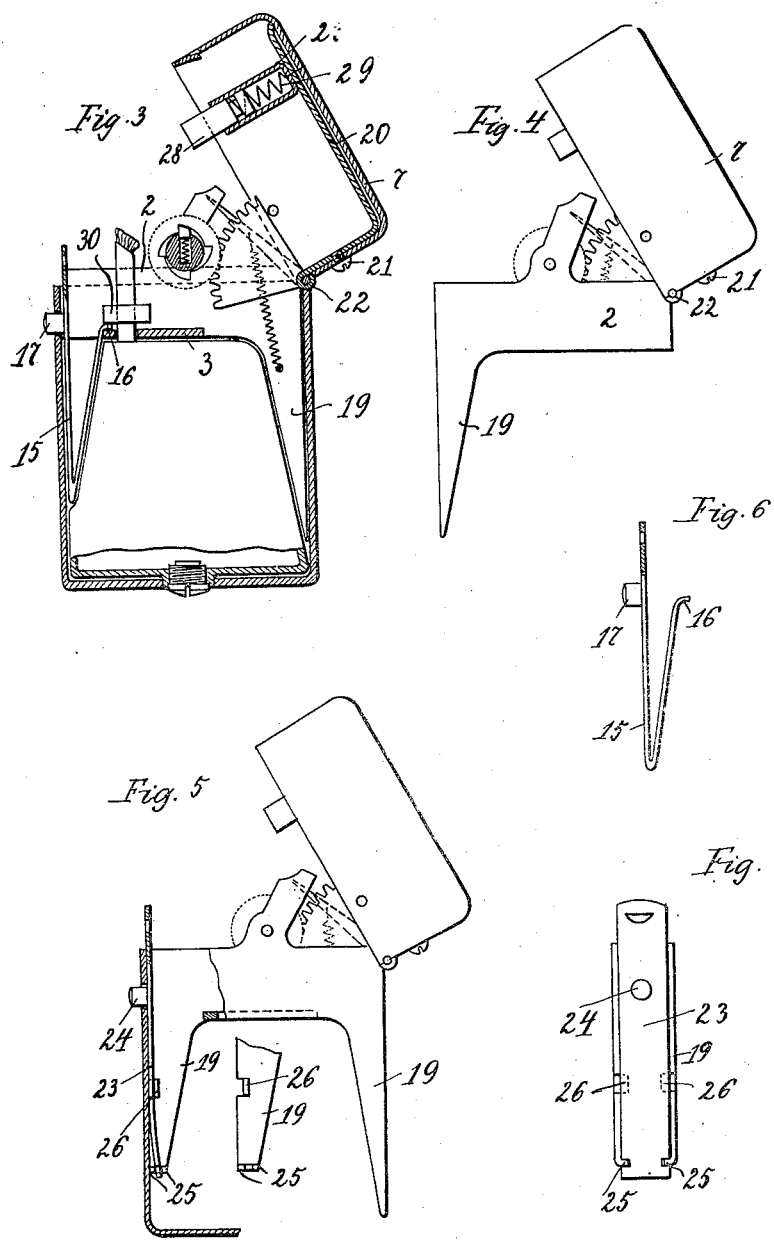

UNITED STATES PATENT OFFICE.

FRITZ HOFMANN, OF MUNICH, GERMANY, ASSIGNOR TO MAX E. BERNHARDT, OF NEW YORK, N. Y.

POCKET FIRE OR LIGHTING APPLIANCE WITH PYROPHORIC METAL.

1,086,175.  Specification of Letters Patent.  Patented Feb. 3, 1914.

Application filed December 14, 1910. Serial No. 597,203.

*To all whom it may concern:*

Be it known that I, FRITZ HOFMANN, manufacturer, a subject of the King of Bavaria, in the Empire of Germany, residing at 57/59 Bayerstrasse, Munich, Kingdom of Bavaria, Germany, have invented certain new and useful Improvements in Pocket Fire or Lighting Appliances with Pyrophoric Metal; and I do hereby declare the following to be a full, clear, and exact description of the invention, such as will enable others skilled in the art to which it appertains to make and use the same.

This invention relates to an improvement of the pocket lighting appliance in which a flame is ignited by friction on pyrophoric metal.

The invention relates more particularly to such a form and arrangement of the constituents necessary for producing a spark, that these parts may be themselves put together without soldering and in this assembled form inserted in a case. This is of great advantage for the cheap wholesale manufacture of the lighting appliance, as the separate parts may be produced independently in large quantities by pressing, stamping and the like, and assembled without difficulty. The assembling is also facilitated, since the case itself, which may be made by pressing or drawing is difficult of access. The changing of the separate constituents is also much facilitated.

A further object of this invention consists in an improved formation of the coupling between the operating tooth wheel and the friction wheel. The coupling most generally used is a lateral clutch coupling. As in this arrangement the teeth by frequent use are rapidly worn away and the coupling ceases to act, by this invention the clutch coupling is replaced by a ratchet coupling.

A further object is to so construct the device as to insure at all times the fixed relative relation of the pyrophoric metal and the friction wheel, and thus insure at all times a proper contact of the pyrophoric metal with the friction surface or periphery of the friction wheel, and to prevent accidental disarrangement of these parts in use.

Several examples of construction of the invention are shown in the accompanying drawings, in which:—

Figure 1 is a vertical longitudinal section of one form of construction of the pocket lighting appliance seen from one side; and Fig. 2, a view from the other side of the parts of the lighting appliance removed from the case; Fig. 3 is a vertical section of a second form of construction of the pocket lighting appliance; Fig. 4, a side view of the parts removed from the case, in a third form of construction; Fig. 5, a side view of a fourth form of construction in section through a part of the case; Figs. 6 and 7 show different shapes and arrangements of the spring closing the lid; Fig. 8 is a longitudinal section; and Fig. 9, a cross section of the coupling; Fig. 10, a longitudinal section of another form of construction of the coupling; and Fig. 11, a plan view of the friction wheel belonging thereto.

A frame formed of two side plates 2 with an under crossbar 3 is removably mounted in the upper part of a case 1 (Fig. 1) formed in one piece, which frame has on one side a socket or holder 4 for the reception of the pyrophoric metal (Figs. 1 and 2). Between the plates a friction wheel 5, and a toothed wheel 6 are mounted, on which latter a toothed sector 8 mounted on the lid 7, acts. In similar manner this lid and also a lever 9 which pushes forward the pyrophoric metal are pivotally mounted between the plates 2. It is to be noted that the socket or holder 4 is fixedly supported with relation to the frame plates 2 and is preferably formed integral with one of said frame plates and slightly inclined rearwardly and overlaps the periphery of the friction wheel, the arrangement being such that the pyrophoric metal is held in proper position to engage the peripheral surface of the friction wheel. Beneath the frame there is located a removable fuel container 10 with a filling aperture at the bottom which may be kept closed by means of a closing screw 11. The filling aperture has an annular neck 12 which projects through the case.

The frame composed of the plates 2 is fixed at one end by means of projections 13 arranged on the plates fitting into apertures of the case 1. The wick tube 14 projects through a round aperture in the center bar 3 between the plates. In order to secure the plates 2 at their other end, a projection 16 mounted on a V-shaped spring 15 is employed, which engages over the crossbar 3 of the plates. This spring has a press stud or knob 17 and is thus secured against dropping out by the opening of the case 1 through which the press stud projects. The press stud thus secures by means of the projection 16 of the spring 15, the plates 2 in their position. If the press stud 17 be moved back so far that it comes out of the opening, the spring 15 may be easily withdrawn, so that the frame is also released and may be removed.

By the arrangement hereinbefore described the possibility is thus afforded of assembling the separate constituents of the pocket lighting appliance outside the case in the simplest manner without soldering (with the exception of the fuel container), whereby the manufacture is substantially simplified and cheapened. The fuel container may also be easily soldered without trouble, as it may be made independently of the case, which latter is stamped out in one piece. It is also possible to easily and rapidly change worn or defective parts of the pocket lighting appliance.

In order to be able to easily raise the pressure lever 9 to allow of a fresh piece of pyrophoric metal being inserted in the holder or socket 4 and thus to expose the latter, an aperture 18 is provided in each side of the lid somewhat below the lever 9 (when the lid is shut) through which apertures a pin or spike may be passed. On the opening of the lid the lever 9 is thus simultaneously lifted by the pin, so that a fresh piece of pyrophoric metal may be inserted in the holder, without it being necessary to take any other parts apart for this purpose.

Instead of securing the frame by the projections 13 (according to Figs. 1 and 2), in the forms of construction shown in Figs. 3 to 5 downwardly extending projections 19 are provided on the plates 2, which projections in the examples of construction shown are formed like tongues, but may also be of any other suitable form. The tongue-shaped projection suitably engages between the wall of the case and the fuel container 10, whereby the frame and the fuel container are maintained in their positions. The frame is held by the hooked projection 16 of the closing spring 15 (see Fig. 3). By withdrawing the closing spring, the constituents of the lighting appliance contained in the lower case 1 are released.

In the form of construction shown in Fig. 3 the tongue 19 is placed at the rear of the lighting appliance, but it may also be arranged, as shown in Fig. 4, at the front. In similar manner two tongues—one at the front and one at the rear—may be provided on the plates 2, as shown in Fig. 5.

In order not to attach the lid 7 directly to the plates 2 by means of a hinge, it is fixed by means of a screw 21 to a frame bent round at right angles. The frame is connected with the plates by means of a hinge 22. The front end of the frame 20 is turned up a little, so that the frame rests on the inside of the lid with a spring action and cannot rattle therein.

Instead of the V-shaped spring shown in Figs. 1, 2 and 6, the spring shown in Figs. 5 and 7 may be employed, which consists of only one leaf 23 and a press stud 24. This blade or leaf is inserted with its lower end, which is preferably nicked from both sides, between forked projections 25 on the lower end of the front tongue 19. The desired springiness of the blade 23 is obtained by lugs 26 which are mounted on the tongue 19 and engage behind the leaf spring 23.

The following arrangement is adapted for tightly closing the wick tube: A displaceable sleeve or socket 28 is provided in the closing cap 27. A spring 29 is mounted behind this sleeve, so that when the lid is closed, the sleeve 28 is pressed elastically against the ordinary elastic ring 30, which surrounds the wick tube. The spring 29 preferably embraces the upper narrowed end of the sleeve 28, and its other end is passed through the cap 27 and the frame 20 and riveted behind them, so that the attachment of the cap 27 and the sleeve 28 to the yoke is thereby obtained.

A ratchet tooth 33 on which a spring 34 acts from beneath, is provided for coupling the toothed wheel 6 with the friction wheel 5 in a radial perforation 32 of a hub 31 mounted on the toothed wheel 6. This ratchet may engage with suitable tooth intervals 35 on the inner side of the friction wheel 5 (Figs. 1, 8 and 9). On opening the lid 7, the toothed wheel 6 on rotating is coupled with the friction wheel 5, which thus produces the spark, while, on closing the lid no coupling takes place.

In the coupling shown in Figs. 10 and 11, instead of the ratchet tooth 33 a springy metal band 36 is wound around the hub 31 in a suitably wide groove, one end 37 of which band engages in a slot in the hub 31. The other free end 38 of the spring band 36 is bent up a little so that it can elastically engage in the tooth intervals 35 of the friction wheel.

Having now particularly described and ascertained the nature of my said invention and in what manner the same is to be performed, I declare that what I claim is:—

1. In a pocket igniter, the combination of a casing; a spring actuated cover; a pyrophorous body; a friction wheel coöperating with said pyrophorous body and actuated by said cover; and a metal frame removably secured within said casing and supporting said friction wheel, the pyrophorous body and the means for actuating the friction wheel, substantially as set forth.

2. In a pocket igniter, the combination of a casing; a spring actuated cover; a pyrophorous body; a friction device coöperating with the latter; a metal frame within said casing and supporting the other above said parts; and a push-spring, removably securing said frame in said casing, substantially as set forth.

3. In a pocket igniter, the combination of a casing; a spring actuated cover; a pyrophorous body; a friction device; a metal frame removably secured within said casing and supporting the first said parts; and a V-shaped push spring, a bent-off extension thereon, and its push-knob protruding through an opening in the casing wall, substantially as set forth.

4. In a pocket igniter, the combination of a casing; a spring actuated cover; a frame with side walls having anterior tongue-shaped extensions removably secured in said casing; and a fuel receptacle, said extensions of the side walls of said frame extending in between the said casing and said fuel receptacle, substantially as set forth.

5. In a pocket igniter, the combination of a casing; a cover thereto; a frame in said casing and having posterior wall extensions; and a fuel receptacle; the posterior wall extensions of said frame fitting in between said casing and said fuel receptacle, substantially as set forth.

6. In a pocket igniter, the combination of a casing; a spring actuated cover; a frame removably secured in said casing and having tongue-shaped extensions at the front and rear; and a fuel receptacle, the said extensions of the frame extending in between said casing and said fuel receptacle, substantially as set forth.

7. In a pocket igniter, the combination of a casing; a supporting frame, composed of two plates having tongue-shaped extensions; a spring; an extension thereon, coöperating with said frame tongues, and a push-knob on said spring, taking through an aperture in said casing, substantially as set forth.

8. In a pocket igniter, the combination of a casing; a cover thereto; a frame removably secured within said casing; an angularly bent support, hinged to said frame and supporting said cover; and means within said cover for extinguishing the flame and preventing evaporation of the fuel, substantially as set forth.

9. In a pocket igniter, a casing, a hinged cover therefor, a friction wheel, means for operating said wheel from the cover, a frame mounted within the casing, an upwardly extending rearwardly inclined stationary holder carried by said frame adjacent to the friction wheel and overlapping the periphery thereof, a pyrophorous body in the holder, and a spring member engaging the pyrophorous body and pressing it toward the periphery of the friction wheel.

10. In a pocket igniter, a casing, a hinged cover therefor, a friction wheel, means for operating said wheel from the cover, a frame mounted within the casing, an upwardly extending rearwardly inclined stationary holder carried by said frame adjacent to the friction wheel and overlapping the periphery thereof, a pyrophorous body in the holder, and a spring member extending into the holder engaging the pyrophorous body and pressing it toward the periphery of the friction wheel.

11. In a pocket igniter, a casing, a hinged cover, a frame mounted within the casing, a stationary holder carried by said frame and projecting upwardly above the casing, a friction wheel pivoted to the frame beneath the holder, a pyrophorous body in said holder, and means to cause said body to frictionally engage the periphery of said friction wheel.

12. In a pocket lamp, the combination, with a lamp-casing and a fluid-font therein, of a frame superposed upon said font and removably retained within said casing, a friction wheel and means to revolve the same, a cover for the lamp-casing carried by the removable frame and a spring carried by the removable frame, acting to throw the cover open when it is released from its catch.

13. In a pocket igniter, the combination of a casing; a cover thereto; a frame therein; an angular support hinged to said frame and supporting said cover; a sleeve on said support; a wick-cover slidable in said sleeve; and a spring in the sleeve back of, and acting on, said wick-cover, substantially as set forth.

14. In a pocket igniter, the combination of a casing; a spring actuated cover; a friction wheel; a socket; a pyrophorous body in this socket; spring actuated lever means for keeping said pyrophorous body in close contact with said friction wheel; said cover having lateral apertures for the purpose of receiving a tool for raising the said lever means together with the cover, substantially as set forth.

15. In a pocket igniter, the combination of a casing; a spring actuated cover; a friction wheel; a toothed wheel actuating said friction wheel; coupling means interposed between said friction wheel and said toothed wheel, comprising a ratchet tooth slidable within the hub of said toothed wheel, and a spring acting on said tooth, the latter adapted to take into recesses provided within said friction wheel, substantially as set forth.

In testimony whereof, I have affixed my signature, in presence of two witnesses.

FRITZ HOFMANN.

Witnesses:
OTTO WIESELSBERGER,
L. LEIB.